US011256894B2

(12) United States Patent
Holland et al.

(10) Patent No.: US 11,256,894 B2
(45) Date of Patent: Feb. 22, 2022

(54) MULTI-STAGE BIOMETRIC AUTHENTICATION

(71) Applicant: QUALCOMM Incorporated, San Diego, CA (US)

(72) Inventors: Wesley James Holland, Encinitas, CA (US); Rashmi Kulkarni, Redwood City, CA (US); Ling Feng Huang, San Diego, CA (US); Huang Huang, San Diego, CA (US); Jeffrey Shabel, San Diego, CA (US); Chih-Chi Cheng, Santa Clara, CA (US); Satish Anand, San Diego, CA (US); Songhe Cai, San Diego, CA (US); Simon Peter William Booth, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 16/703,616

(22) Filed: Dec. 4, 2019

(65) Prior Publication Data
US 2021/0174047 A1 Jun. 10, 2021

(51) Int. Cl.
*G06K 9/00* (2006.01)
*G06F 21/32* (2013.01)
*G01N 21/31* (2006.01)
*H04L 9/32* (2006.01)

(52) U.S. Cl.
CPC ........... *G06K 9/0004* (2013.01); *G01N 21/31* (2013.01); *G06F 21/32* (2013.01); *G06K 9/00073* (2013.01); *H04L 9/3231* (2013.01); *G01N 2021/3196* (2013.01); *G01N 2201/1244* (2013.01)

(58) Field of Classification Search
CPC ............ G06K 9/0004; G06K 9/00073; G06K 9/00006; G06K 9/209; G06K 9/6272; G01N 21/31; G01N 2021/3196; G01N 2201/1244; G06F 21/32; H04L 9/3231; H04L 63/0861
USPC ........................................................ 382/124
See application file for complete search history.

(56) References Cited

U.S. PATENT DOCUMENTS 10,073,953 B2 * 9/2018 Xing ..................... G06Q 20/322
10,783,227 B2 * 9/2020 Van Os ................ G06F 3/04883
10,803,281 B2 * 10/2020 Han ........................ G06F 21/32
(Continued)

*Primary Examiner* — Mahendra R Patel
(74) *Attorney, Agent, or Firm* — Patterson & Sheridan, L.L.P/Qualcomm

(57) ABSTRACT

In some aspects, the present disclosure provides a method for managing a command queue in a universal flash storage (UFS) host device. The method includes determining to power on a first subsystem of a system-on-a-chip (SoC), wherein the determination to power on the first subsystem is made by a second subsystem of the SoC based on detection of user identity data contained in a first image frame during an initial biometric detection process. In certain aspects, the second subsystem is configured to operate independent of the first subsystem and control power to the first subsystem. In certain aspects, the second subsystem includes a second optical sensor, a set of ambient sensors, and a second processor configured to detect, via a set of ambient sensors, an event comprising one or more of an environmental event outside of the device or a motion event of the device.

18 Claims, 4 Drawing Sheets

(56) References Cited

U.S. PATENT DOCUMENTS

| | | | |
|---|---|---|---|
| 10,860,096 B2* | 12/2020 | Kelly | G06F 3/167 |
| 10,956,550 B2* | 3/2021 | Fadell | G06F 3/0488 |
| 11,074,572 B2* | 7/2021 | Van Os | G06Q 20/327 |
| 11,100,349 B2* | 8/2021 | Cohen | G06K 9/00926 |
| 11,140,336 B2* | 10/2021 | Brook | H04N 5/2356 |
| 11,170,085 B2* | 11/2021 | Devine | G06F 21/32 |
| 2006/0248554 A1* | 11/2006 | Priddy | H04N 21/41407 |
| | | | 725/25 |
| 2010/0290668 A1* | 11/2010 | Friedman | G06K 9/00255 |
| | | | 382/103 |
| 2017/0255766 A1* | 9/2017 | Kaehler | G06K 9/00617 |
| 2017/0337805 A1* | 11/2017 | Eyring | G08B 25/006 |
| 2018/0078151 A1* | 3/2018 | Allec | A61B 5/0261 |

* cited by examiner

MULTI-STAGE BIOMETRIC AUTHENTICATION

BACKGROUND

Field of the Disclosure

The teachings of the present disclosure relate generally to biometric authentication processes, and more particularly, to techniques for power efficient biometric authentication processes.

Description of the Related Art

Authorization procedures may be performed to identify a person as being authorized to engage in an activity. For example, the activity may be authorizing a financial transaction, gaining access to information on a device, or entering a secure location. Often, the authorization procedure is performed by comparing database information to information carried on an identification card, or other token. If information on the token matches information in the database, the activity is authorized. However, such token-based authorization systems are problematic because the token may be stolen and used by an unauthorized person.

Some authorization systems require the user to remember one or more codes. For example, to gain access to a secure room, a person is often required to enter a code before a door will unlock. Such a system is an example of a purely knowledge-based system since authorization is dependent only on the user's knowledge of the code. Knowledge-based authorization systems are problematic in that many people have trouble remembering the authorization code. Further, the authorization code may be discovered by unauthorized persons, and later used to gain authorization.

Thus, some authorization systems may use biometrics to identify and authorize the user. In some examples, a biometric includes a fingerprint, hand geometry, facial features, or some other suitable physical characteristic. Such authorization systems typically rely on optical sensors to support authorization of a user. However, these systems require a relatively high amount of power to operate.

Accordingly, what is needed are systems and methods for providing biometric authorization while reducing the amount of power required by such a system.

SUMMARY

Certain aspects of the disclosure describe a system on a chip (SoC) in a device. In some configurations, the SoC includes a first subsystem of the SoC comprising a first optical sensor and a first processor, and a second subsystem of the SoC configured to operate independent of the first subsystem and control power to the first subsystem, the second subsystem comprising a second optical sensor, a set of ambient sensors, and a second processor. In some configurations, the second processor is configured to detect, via the set of ambient sensors, an event comprising one or more of an environmental event outside of the device or a motion event of the device. In response to a determination that the event is qualified under a predetermined criteria indicative of a user engaging the device, the second processor is further configured to: select a plurality of operating parameters for the second optical sensor based on the detected event, power on the second optical sensor, capture, via the second optical sensor, a first image frame according to the plurality of operating parameters, and perform an initial biometric detection process on the first image frame, the initial biometric detection process configured to detect user identity data contained in the first image frame.

Certain aspects of the present disclosure provide a method for optical biometric user authentication by a system on a chip (SoC) in a device. In some configurations, the method includes determining to power on a first subsystem of the SoC, the determination to power on the first subsystem made by a second subsystem of the SoC based on detection of user identity data contained in a first image frame during an initial biometric detection process, the second subsystem configured to operate independent of the first subsystem and control power to the first subsystem, the second subsystem comprising a second optical sensor, a set of ambient sensors, and a second processor. In come configurations, the method includes detecting, via a set of ambient sensors, an event comprising one or more of an environmental event outside of the device or a motion event of the device. In response to a determination that the event is qualified under a predetermined criteria indicative of a user engaging the device, the method may include selecting, by the second processor, a plurality of operating parameters for the second optical sensor based on the detected event. In some configurations, the method may include powering on, by the second processor, the second optical sensor. In come configurations, the method may include capturing, by the second optical sensor, the first image frame according to the plurality of operating parameters. In some configurations, the method may include performing, by the second processor, the initial biometric detection process on the first image frame, the initial biometric detection process configured to detect the user identity data contained in the first image frame.

Certain aspects of the present invention provide a non-transitory computer-readable storage medium that stores instructions that when executed by a processor of an apparatus cause the apparatus to perform a method for optical biometric user authentication by a system on a chip (SoC) in a device. In some configurations, the method includes determining to power on a first subsystem of the SoC, the determination to power on the first subsystem made by a second subsystem of the SoC based on detection of user identity data contained in a first image frame during an initial biometric detection process, the second subsystem configured to operate independent of the first subsystem and control power to the first subsystem, the second subsystem comprising a second optical sensor, a set of ambient sensors, and a second processor. In come configurations, the method includes detecting, via a set of ambient sensors, an event comprising one or more of an environmental event outside of the device or a motion event of the device. In response to a determination that the event is qualified under a predetermined criteria indicative of a user engaging the device, the method may include selecting, by the second processor, a plurality of operating parameters for the second optical sensor based on the detected event. In some configurations, the method may include powering on, by the second processor, the second optical sensor. In come configurations, the method may include capturing, by the second optical sensor, the first image frame according to the plurality of operating parameters. In some configurations, the method may include performing, by the second processor, the initial biometric detection process on the first image frame, the initial biometric detection process configured to detect the user identity data contained in the first image frame.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

Figure 1:
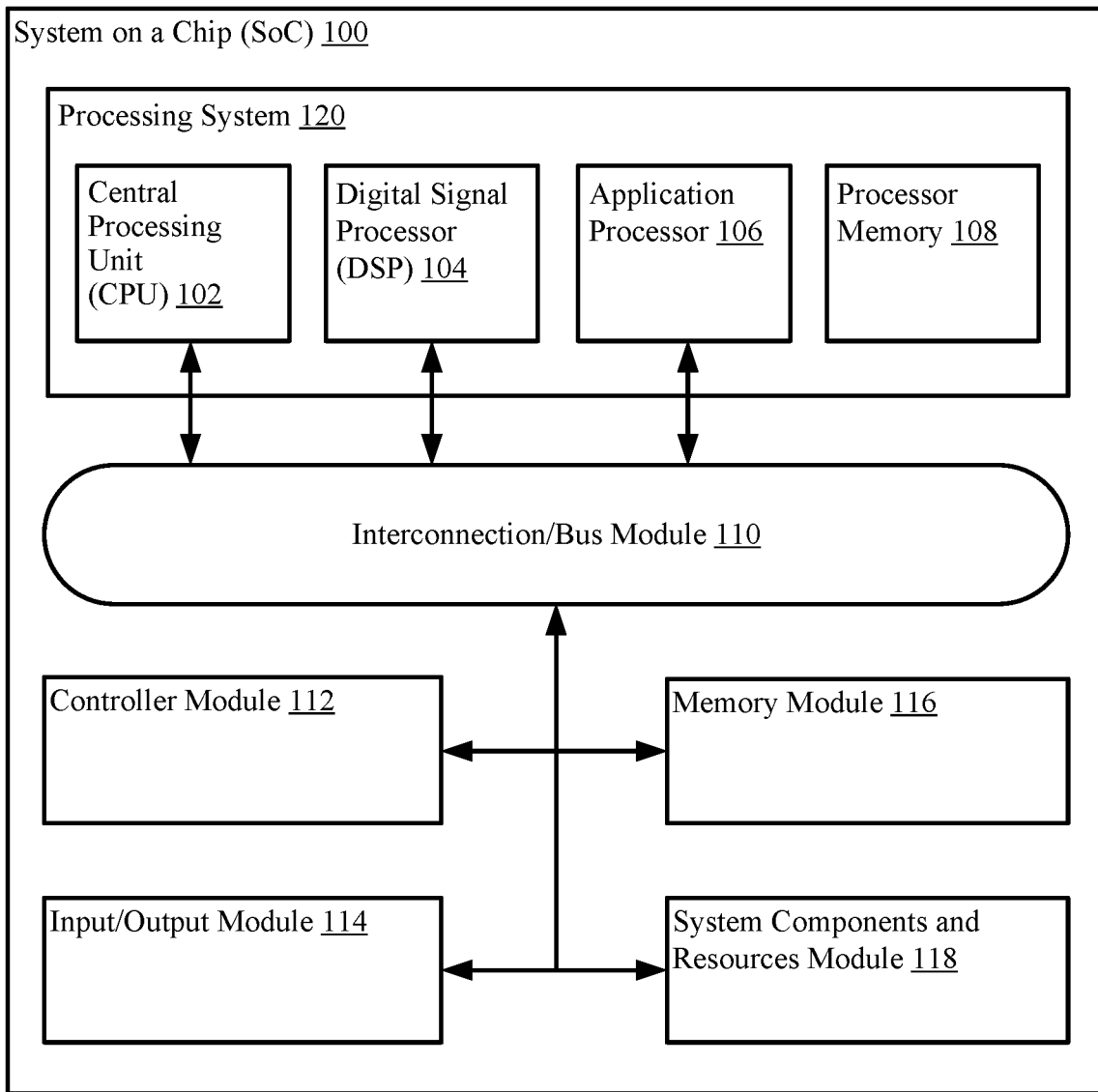
FIG. 1 is a block diagram illustrating an exemplary system-on-chip (SoC) integrated circuit (IC) in accordance with certain aspects of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

DETAILED DESCRIPTION

Physiological and/or behavioral characteristics of an individual are often referred to as "biometrics," and biometrics may be used to identify a person as being someone authorized to engage in an activity. The biometric used by such authorization systems typically include a fingerprint, but some systems use an image of the person's fingerprint, hand geometry, or facial features. Such systems rely on optical sensors to generate an image frame of the fingerprint, hand geometry, or facial features, and a processor to perform biometric detection in the image frame. However, such systems require a relatively high amount of power to operate the camera and perform the biometric detection. Thus, making use of such biometric detection techniques in battery powered devices may pose challenges to battery life and effective usage of the devices.

Accordingly, aspects described herein relate to methods and apparatuses for reducing the amount of power required for providing biometric authorization of a user. For example, certain aspects may relate to a device that includes a pair of subsystems, each of which includes an optical sensor configured to support biometric authentication. A first subsystem may include a first high resolution optical sensor, and a second subsystem may include a relatively lower resolution optical sensor. In order to reduce power consumption of the device, the first subsystem may remain in a low power mode or an OFF power mode until triggered awake or ON by the second subsystem. Because the second subsystem includes the relatively lower resolution camera, powering the second subsystem is less of a power draw than powering the first subsystem.

Thus, according to certain embodiments, the second subsystem may utilize the second optical sensor to determine whether a particular event corresponds to an attempt by a user to gain access to the device. That is, the second subsystem may provide an initial authorization function to determine whether to wake or power ON the first subsystem, which is configured to provide a higher resolution authorization determination.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with various other embodiments discussed herein.

The term "system on chip" (SoC) is used herein to refer to a single integrated circuit (IC) chip that contains multiple resources and/or processors integrated on a single substrate. For example, a single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects of the present disclosure. Such memory technologies/types include phase change memory (PRAM), dynamic random-access memory (DRAM), static random-access memory (SRAM), non-volatile random-access memory (NVRAM), flash memory (e.g., embedded multimedia card (eMMC) flash, flash erasable programmable read only memory (FEPROM)), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory.

Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, global positioning system (GPS) processors, display processors, etc.), complex memory systems, intricate electrical interconnections (e.g., buses and/or fabrics), and numerous other resources that execute complex and power intensive software applications (e.g., video streaming applications, etc.).

FIG. 1 is a block diagram illustrating an exemplary system-on-chip (SoC) 100 suitable for implementing various aspects of the present disclosure. The SoC 100 includes a processing system 120 that includes a plurality of heterogeneous processors such as a central processing unit (CPU) 102, a digital signal processor (DSP) 104, an application processor 106, and a processor memory 108. The processing system 120 may include one or more cores, and each processor/core may perform operations independent of the other processors/cores. The processors 102, 104, and 106 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The processing system 120 is interconnected with one or more controller module(s) 112, input/output (I/O) module(s) 114, memory module(s) 116, and system component and resources module(s) 118 via a bus module 110 which may include an array of reconfigurable logic gates and/or implement bus architecture (e.g., CoreConnect, advanced microcontroller bus architecture (AMBA), etc.). Bus module 110 communications may be provided by advanced interconnects, such as high performance networks on chip (NoCs). The interconnection/bus module 110 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the bus module 110 may implement an arbitration scheme to prevent multiple master components from attempting to drive the bus simultaneously.

The controller module 112 may be a specialized hardware module configured to manage the flow of data to and from the memory module 116, the processor memory 108, or a memory device located off-chip (e.g., a flash memory device, off-chip DRAM, etc.). In some examples, the memory module may include a host device configured to receive various memory commands from multiple masters, and address and communicate the memory commands to the memory device. The multiple masters may include processors 102, 104, and 106, and/or multiple applications running on one or more of the processors 102, 104, and 106. The controller module 112 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The I/O module 114 is configured for communicating with resources external to the SoC. For example, the I/O module 114 includes an input/output interface (e.g., a bus architecture or interconnect) or a hardware design for performing specific functions (e.g., a memory, a wireless device, and a digital signal processor). In some examples, the I/O module includes circuitry to interface with peripheral devices, such as a memory device located off-chip, or other hardware located off chip (e.g., image sensors, ambient light sensors, motion sensors, etc.).

The memory module 116 is a computer-readable storage medium implemented in the SoC 100. The memory module 116 may provide non-volatile storage, such as flash memory or DRAM, for one or more of the processing system 120, controller module 112, I/O module 114, and/or the system components and resources module 118. The memory module 116 may include a cache memory to provide temporary storage of information to enhance processing speed of the SoC 100. In some examples, the memory module 116 may be implemented as a memory device integrated into the SoC 100 and/or an external memory device.

The SoC 100 may include a system components and resources module 118 for managing sensor data, analog-to-digital conversions, wireless data transmissions, and for performing other specialized operations (e.g., supporting interoperability between different devices). System components and resources module 118 may also include components such as voltage regulators, oscillators, phase-locked loops, peripheral bridges, data controllers, system controllers, access ports, timers, and other similar components used to support the processors and software clients running on the computing device. The system components and resources 118 may also include circuitry for interfacing with peripheral devices, such as cameras, electronic displays, wireless communication devices, external memory chips, etc.

SoCs are often integrated with image sensors (e.g., digital cameras) in a mobile device to enable generation of biometric image frames and processing of the biometric image frames for authenticating and providing a user with access to the device. Such mobile devices may include, for example, cellular phones, smart phones, laptops, handheld communication devices, handheld computing devices, satellite radios, global positioning systems, PDAs, and/or any other mobile device. An example of two common biometric authentication schemes may include face authentication, wherein a camera captures and authenticates an image frame of a user's face, and fingerprint authentication, wherein the camera captures and authenticates an image of a user's fingerprint. Images of other characteristics of the user may be used in other examples, including images of a palm print, an iris, and other human characteristics.

However, the power cost for capturing an image frame and processing the image frame by an SoC is typically high due to use of external memory resources during image processing and authentication. Moreover, leakage and idle power of SoC components during image capture, high resolution image processing, and processing of advanced camera features can also result in high power costs.

Yet, from a user perspective, always on (AON) user authentication is desirable. For example, it may be desirable for a user to have a smart phone configured to trigger biometric authentication whenever an appropriate biometric is present (e.g., when the user's face is facing an AON camera on the smart phone, or the user's finger is on the fingerprint sensor, etc.). Accordingly, the disclosure provides techniques for providing AON user authentication while reducing the amount of power required to support such authentication.

Figure 2:
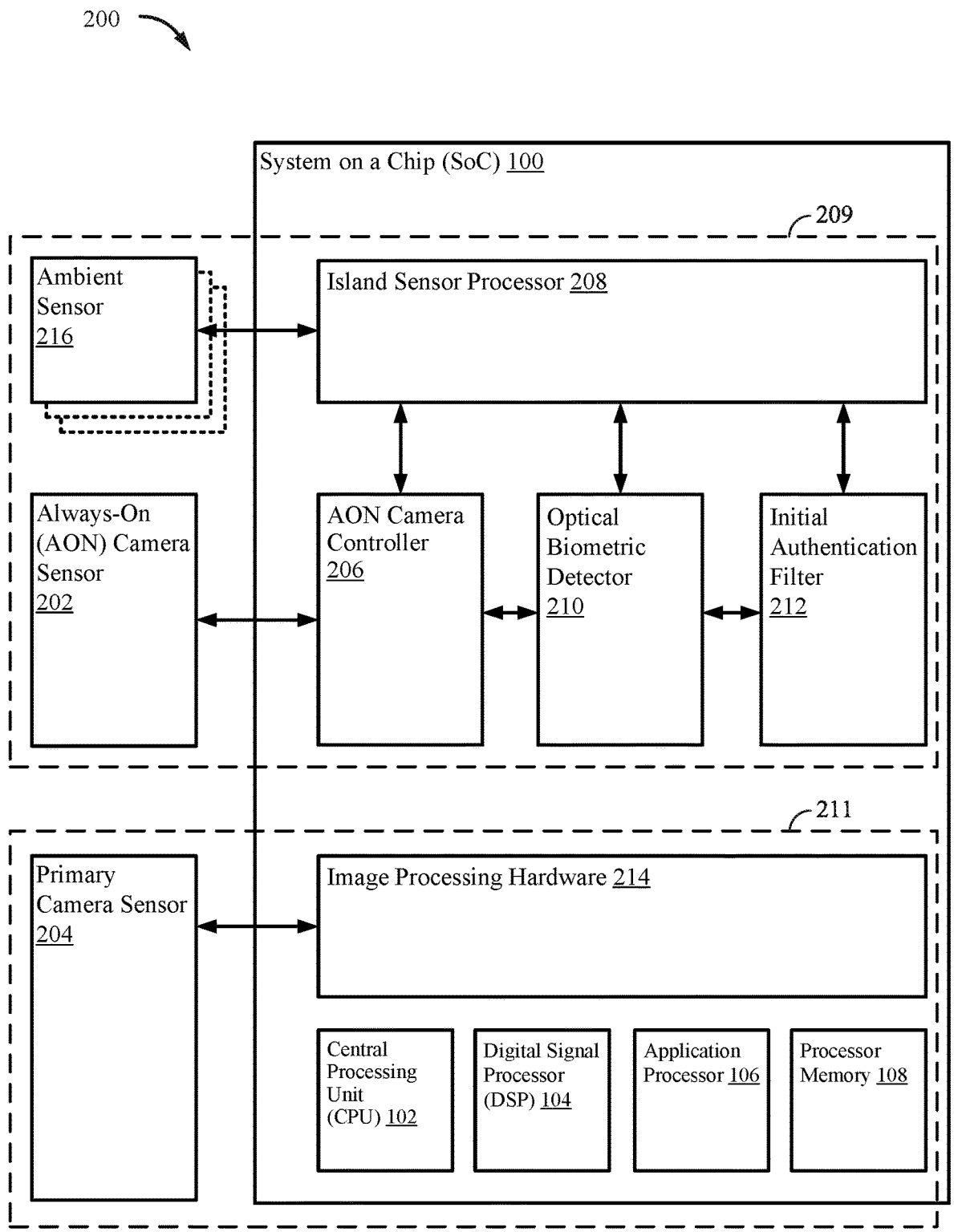
FIG. 2 is block diagram illustrating an exemplary system including an always on (AON) camera coupled to an SoC in accordance with certain aspects of the present disclosure.

FIG. 2 is block diagram illustrating an exemplary SoC 100 (e.g., the SoC 100 from FIG. 1) including an island subsystem 209 and a non-island subsystem 211. The island subsystem 209 may include an AON camera sensor 202, one or more ambient sensor(s) 216, island sensor processor 208, an AON camera controller 206, an optical biometric detector, and an initial authentication filter 212. In some examples, one or more of AON camera sensor 202 and ambient sensor(s) 216 may be external to the SoC 100; however, an AON camera sensor 202 and/or one or more ambient sensor(s) 216 integrated within the SoC 100 is also within the scope of the disclosure.

The non-island subsystem 211 may include a primary camera sensor 204, image processing hardware 214, and other non-island subsystems and/or processors (e.g., CPU 102, DSP 104, application processor 106, and processor memory 108). In some examples, primary camera sensor 204 may be external to the SoC 100; however, a primary camera sensor 204 integrated within the SoC 100 is also within the scope of the disclosure.

It should be noted that the island subsystem 209 may operate independent of the non-island subsystem 211. In some examples, the term "island" may relate to processors and/or subsystems that operate and are powered independently of other processors and/or subsystems of the SoC 100. Such subsystems may operate, for example when the rest of the SoC 100 is in a low power mode, such as a non-functional, sleep, or zero-voltage state or mode. In the example of FIG. 2, the SoC 100 may be configured to provide power to components of the island subsystem 209 independent of the non-island subsystem 211. In some examples, the SoC 100 provides power to the island subsystem 209 independent of the non-island subsystem 211. For example, the SoC 100 may provide power to the AON camera sensor 202, one or more ambient sensor(s) 216, and corresponding hardware and software elements (e.g., AON camera controller 206, island sensor processor 208, optical biometric detector 210, and initial authentication filter 212). Thus, the SoC 100 may operate the island 209 subsystem without incurring the power cost of operating or waking up the non-island subsystem 211. In some examples, the island subsystem 209 may include a dedicated power rail, ring oscillator clock domain, and dedicated processor or digital signal processor (DSP) coupled to a sensor and/or a memory, or alternately, a state machine instead of the processor or DSP.

The AON camera sensor 202 and the primary camera sensor 204 may include general purpose or special purpose image sensors. For example, the image sensors may include photosensitive devices including, but not limited to, semiconductor charge-coupled devices (CCD) or active pixel sensors in CMOS or N-Type metal-oxide-semiconductor (NMOS) technologies. In one example, the AON camera sensor 202 may have a lower power requirement than the primary camera sensor 204. In such an example, the AON camera sensor 202 may be physically smaller than the primary camera sensor 204, have a reduced resolution relative to the primary camera sensor 204, and require less power to operate relative to the primary camera sensor 204.

The island sensor processor 208 may control and receive data from one or more ambient sensor(s) 216. For example, the ambient sensor(s) 216 may include one or more of an audio sensor (e.g., microphone, acoustic wave sensor (MEMS), etc.), motion sensors (e.g., gyroscope, accelerometer, proximity sensor, barometer, inertial sensors, etc.), and/or an ambient light sensors (ALS), or other suitable optical sensors. It should be noted that in some embodiments, the AON camera sensor 202 may operate as an ambient light sensor in lieu of an optical sensor among the ambient sensor(s) 216. In some examples, the island sensor processor 208 may be configured to enable and disable (e.g., power on and power off) the AON camera controller 206 and the AON camera sensor 202 based on feedback from the ambient sensor(s) 216. For example, if the ambient sensor(s) 216 provide feedback indicative of an event, the island sensor processor 208 may power on the AON camera controller 206 and the AON camera sensor 202 so the AON camera sensor 202 may capture an image frame. In some examples, the island sensor processor 208 may be configured to enable and disable (e.g., power on and power off) the optical biometric detector 210 and the initial authentication filter 212.

In certain aspects, the AON camera controller 206 is configured to control the AON camera sensor 202 and communicate with the optical biometric detector 210. In some examples, the AON camera controller 206 is configured to communicate an indication of one or more operational parameters to the AON camera sensor 202 that the AON camera sensor 202 will use for capturing an image frame. For example, the operating parameters may include one or more of an image resolution, a framerate, a readout rate, a focal length, shutter speed, exposure time, etc., of the AON camera sensor 202.

The AON camera controller 206 may communicate image frames captured by and received from the AON camera sensor 202 to the optical biometric detector 210 for biometric evaluation. The optical biometric detector 210 may be configured to analyze the image frames to detect and identify a biometric feature as a characteristic in a portion of at least one of the image frames by determining or calculating biometric features (e.g. local binary pattern, histogram of oriented gradients, etc.) in the image frame.

In certain aspects, the optical biometric detector 210 is configured to receive image frames from the AON camera controller 206, and communicate with an initial authentication filter 212. In some examples, the optical biometric detector 210 may provide an indication of detected biometric features to the initial authentication filter 212, which can then compare the biometric features with reference biometric data stored on a digital storage device on the SoC 100 or external to the SoC 100. The initial authentication filter 212 may be a relatively less sophisticated version of a full-feature authentication process. For example, a full-feature authentication process may utilize one or more algorithms and models to analyze the biometric features detected by the optical biometric detector 210. For example, the full-feature authentication process may utilize one or more of a linear regression model configured to analyze a large number of the biometric features detected in an image frame, a large convolutional neural network (e.g., visual geometry group (VGG)), and/or a biometric algorithm run on a high resolution image frame. In contrast, the initial authentication filter 212 may utilize one or more of: a linear regression model configured to analyze a relatively small number of visual features (e.g., local binary pattern only), a small convolutional neural network (e.g., LeNet), and/or a biometric algorithm configured to run on a low resolution image frame. Accordingly, the initial authentication filter 212 may be simpler and require less power relative to full-feature authentication processing. Notably, the SoC 100 may access data from a convolutional neural network via one or more of a local storage (e.g., the memory module 116 of FIG. 1) or from a remote storage (e.g., a remote storage system (RSS), a cloud server, and any other suitable network file system and storage networks).

In certain aspects, the primary camera sensor 204 may be connected to image processing hardware 214 configured to control operations of the primary camera sensor 204. The image processing hardware 214 may be configured for full-feature authentication processing. In some examples, the image processing hardware 214 and primary camera sensor 204 are non-island hardware, meaning that they are not operated independently from common aspects of the SoC 100. For example, the image processing hardware 214 and the primary camera sensor 204 may be operated using the same voltage rails and clock domains as those used by the CPU 102, the DSP 104, the application processor 106, and/or the processor memory 108.

In certain aspects, the SoC 100 is configured for multi-stage optical biometric authentication to reduce power consumption. In some examples, the optical biometric authentication may comprise four stages (e.g., stage 0 through stage 3), wherein stage 0 is a lowest relative power stage, and stage 3 is a highest relative power stage. That is, each of the multiple stages may correspond to particular capabilities that increase as the SoC 100 progresses through the stages from stage 0 to stage 3. Accordingly, average power for the authentication may be relatively low in initial stages. Applying such a range of power across multiple stages allows for a computing system to conserve power and make initial determinations for authentication prior to committing a relatively large amount of power to a full-feature authentication process.

Example Power Efficient, Multi-Stage Optical Biometric Authentication

Figure 3:
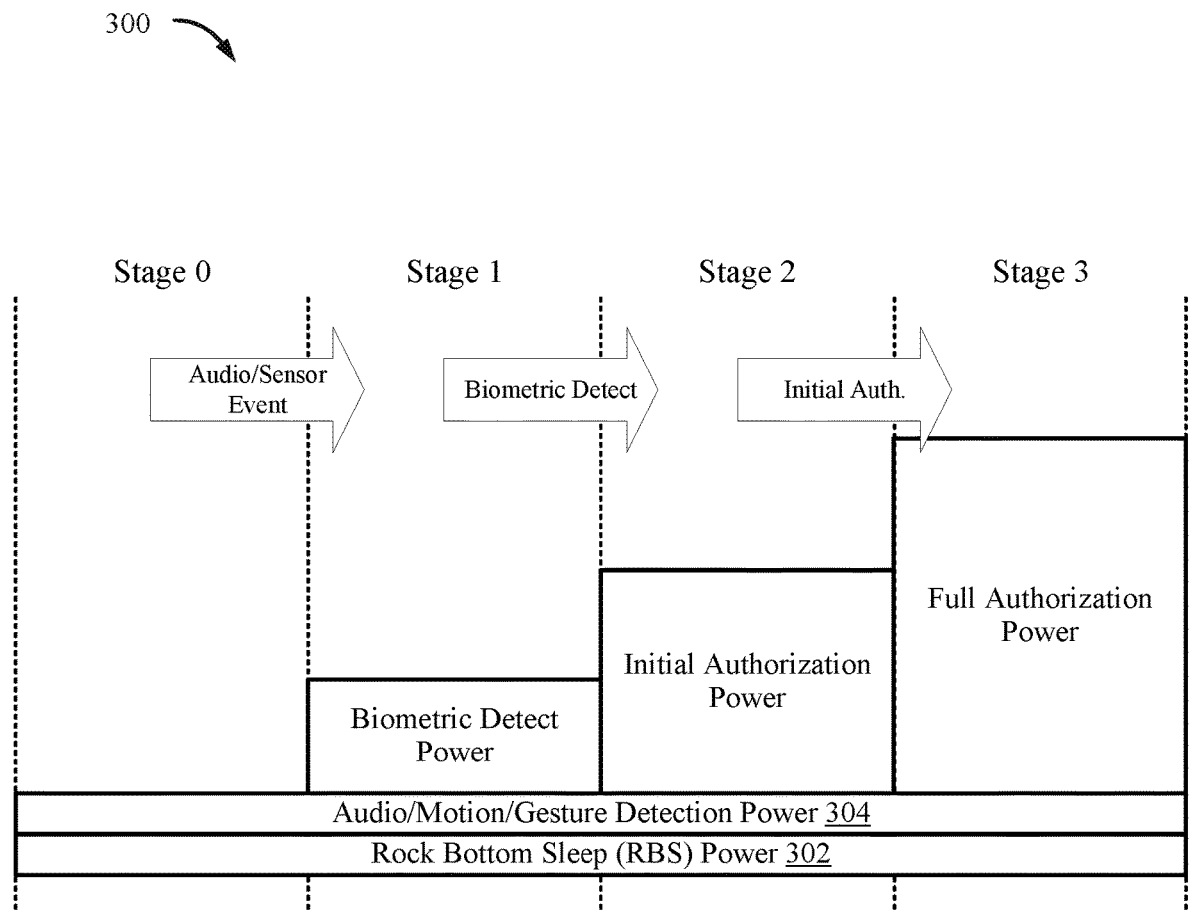
FIG. 3 is block diagram illustrating relative power usage corresponding to each stage in an example process, in accordance with certain aspects of the present disclosure.

FIG. 3 is diagram illustrating relative power usage corresponding to each stage of an example low power, multi-stage, initial authentication process 300. As shown in FIG. 3, the initial authentication process 300 includes four stages (e.g., stage 0-3) of power consumption. Throughout each of the stages, an SoC (e.g., the SoC 100 of FIGS. 1 and 2) may utilize a rock bottom sleep (RBS) power 302 (e.g., a low power state of the SoC 100 or a minimum amount of power for SoC 100 functionality), and audio/motion/gesture detection power 304 required for operation of one or more audio sensors, motion sensors, and/or gesture sensors (e.g., the AON camera sensor 202 and/or the one or more ambient sensor(s) 216 of FIG. 2).

In certain aspects, power consumptions of the SoC 100 may be configured to gradually progress through stages 0-3. For example, starting at stage 0, the SoC 100 may be configured to power on additional components if an event is detected by the AON camera sensor 202 and/or the one or more ambient sensor(s) 216. Powering on the additional components may indicate a transition from stage 0 to stage 1. For example, the AON camera sensor 202 and/or the one or more ambient sensor(s) 216, being powered at stage 0 (e.g., audio/motion/gesture detection power 304), may detect an event which triggers the island sensor processor (e.g., island sensor processor 208) to power on one or more of the AON camera sensor 202, the AON camera controller 206, and the optical biometric detector 210. It should be noted that one or more of the AON camera sensor 202 and the AON camera controller 206 may be powered by the audio/motion/gesture detection power 304 at stage 0. For example, the AON camera sensor 202 may be utilized as an ambient light sensor. In such an example, both the AON camera sensor 202 and the AON camera controller 206 may be powered at stage 0.

In stage 0, the SoC 100 may use only relatively low power for operating audio sensors and/or motion sensors (e.g., AON camera sensor 202 and/or one or more ambient sensors 216). If an event is detected by the audio sensors and/or motion sensors, then the SoC 100 may proceed to stage 1. That is, the sensor/audio processing hardware 208 may request that the AON camera controller 206 power on/off the AON camera sensor 202 based on an audio/sensor event detected from the audio sensors and/or motion sensors. In certain aspects, if the island sensor processor 208 fails to detect a biometric feature in an image frame captured by the AON camera sensor 202, then the SoC 100 may power down one or more components and return to the power consumption of stage 0. Alternatively, if the island sensor processor 208 detects a biometric feature in an image frame captured by the AON camera sensor 202, power consumption of the SoC 100 may progress from stage 1 to stage 2, where the island sensor processor 208 powers on the initial authentication filter (e.g., the initial authentication filter 212 of FIG. 2).

In certain aspects, if the initial authentication filter 212 determines that the biometric feature detected by the optical biometric detector 210 does not have a high enough likelihood of authentication, then the SoC 100 may power down one or more components and return to the power consumption of stage 0 or stage 1. Alternatively, if the initial authentication filter 212 determines that the biometric feature detected by the optical biometric detector 210 has a likelihood of being authenticated, then the island sensor processor 208 may cause the SoC 100 enter into stage 3 power consumption, by triggering the SoC 100 to power on the primary camera sensor 204 and the image processing hardware 214 for a full-feature authentication process.

In one example, the motion sensors, and/or gesture sensors may detect an event of the SoC 100, or a device the SoC 100 is incorporated into (e.g., a mobile device). In some examples, the event may include being moved (e.g., flipped over, raised, lowered, etc.), or detect that an amount of light received by an optical sensor (e.g., AON camera sensor 202 and/or ALS sensor of the ambient sensors 216) has changed (e.g., a previously obstructed sensor is now receiving light, etc.), or any other suitable change in the environment or location of the device.

In certain aspects, the island sensor 209 may detect an event and determine that the event is a qualifying event that triggers the island sensor processor 208 to power-on additional components of the SoC 100, causing power consumption of the SoC 100 to progress from stage 0 to stage 1. It should be noted however, that only qualifying events may cause such a progression in power consumption. For example, qualifying events may include a determination by the island sensor processor 208, based on feedback of the sensors (e.g., one or more of the AON camera sensor 202 and/or the one or more ambient sensor(s) 216), that: (i) the device has been flipped over, exposing a previously obstructed down-facing optical sensor (e.g., AON camera sensor 202 or ALS), as detected by a one or more of a gyroscope, accelerometer, and/or proximity-based process; (ii) the device is moved from an area of relative darkness to an area having a brightness above a user-configurable threshold of brightness, as detected by feedback of the ALS; (iii) the device is being elevated, as detected via feedback of a barometer; (iv) the device being exposed to a sound exceeding a user-configurable volume or decibel threshold, as detected by an audio sensor; (v) the device is exposed to human voice activity, as detected by an audio sensor; and/or (vi) the device is exposed to a nearby human presence, as detected by a combination of one or more of a gyroscope, accelerometer, proximity based process, ALS, barometer, and/or audio processing.

By way of example, human presence detection is a detection of a nearby human presence. Such detection can generally be accomplished via a combination of data from multiple different sensors. For example, if one or more of a variation in ambient light (e.g., indicative of a person walking nearby and obstructing a light source relative to an ambient light sensor) is detected along with a human voice (e.g., detected via a microphone), along with movement of the phone (detected via inertial sensors) and barometer changes (e.g., indicative of rapid movement), then the island sensor processor 208 may determine that there is a human presence nearby. Likewise, stillness across all these modalities could be interpreted by the island sensor processor 208 as an indicator of a lack of human presence.

In some examples, the island sensor processor 208 may request that the AON camera controller 206 power off the AON camera sensor 202, or keep the SoC 100 in the stage 0 power consumption state, if the detected event does not qualify a progression from stage 0 to stage 1 (e.g., the powering on of additional components of the island subsystem 209). For example, events that do not qualify may include a determination by the island sensor processor 208, based on feedback of the sensors (e.g., one or more of the AON camera sensor 202 and/or the one or more ambient sensor(s) 216), that: (i) the device is flipped over, obstructing a previously exposed world-facing optical sensor, as detected by one or more of the gyroscope, accelerometer, and/or proximity-based process; (ii) the device is moved from an area of relative brightness to an area of darkness, wherein the brightness of the area falls below a user-configurable threshold as detected by feedback of the ALS; (iii) the device is being lowered, as detected by the barometer; (iv) the device is exposed to a configurable duration of low intensity sound (e.g., low volume or no sounds for a specific length of time), as detected by the audio sensor; (v) the device is removed from human voice activity, as detected by the audio processor and voice recognition processes of the island sensor processor 208; (vi) the device is removed from human presence, as detected by a combination of one or more of a gyroscope, accelerometer, proximity based process, ALS, barometer, and/or audio processing.

In stage 1, the SoC 100 may use more power relative to stage 0 by providing power to an optical biometric detector 210 and AON camera sensor 202 after an audio/sensor event (e.g., the qualifying event) detected by the one or more audio sensors, motion sensors, and/or gesture sensors. For example, in stage 1, without leaving island mode, the AON camera sensor 202 is powered on and configured for the proper framerate and resolution, and an image frame is captured via the AON camera sensor 202. The biometric detection 210 may be configured to detect identity information of a user, utilizing a neural network process to detect face characteristics, fingerprint patterns, and other physical characteristics identified in the image frame.

In some examples, the AON camera controller 206 may be configured to adjust the operational parameters (e.g., resolution, frame rate, focal length, power state, etc.) of the AON camera sensor 202 based on the audio/sensor event that triggers the SoC 100 to transition from stage 0 from stage 1. For example, the audio/sensor event may indicate a likelihood of the existence of optical biometrics, a distance of the optical biometrics, and/or a relative motion of the optical biometrics. Thus, the AON camera controller 206 may utilize a look-up table to determine operational parameters that correspond to the audio/sensor event. An example look-up table is provided below in Table 1.

TABLE 1

| Audio/Sensor Event | Resolution | Framerate | Focal Length |
|---|---|---|---|
| Device Raised | Quarter-quarter video graphics array (QQVGA) | 30 fps | 0.5 m |
| Device Flipped over | Quarter VGA (QVGA) | 15 fps | 1 m |
| Voice Activity Detected | VGA | 5 fps | Infinity |

For example, if the barometer detects that the device is raised, there may be an increased likelihood that a biometric feature will be detected by the optical biometric detector 210 in an image frame captured by the AON camera sensor 202. Thus, a relatively low resolution may be used (e.g., QQVGA) as it will be expected that a user's face will likely be in view of the device. In another example, a relatively higher resolution may be used for detected voice activity, as a user's face may not be as likely to be in view (e.g., the face may be further away) as with the device being raised. As such, a higher resolution may be required for the optical biometric detector 210 to detect a biometric feature.

In certain aspects, if the optical biometric detection 210 cannot detect identity information of a user or biometric features in an image frame, then the AON camera sensor 202 may capture a new image frame and the optical biometric detection 210 may be performed on the newly captured image frame. In some examples, if more than a configurable, threshold number of image frames are captured by the AON camera sensor 202 without detecting identity information of a user, the SoC 100 may return to stage 0 power consumption. In some examples, the AON camera controller 206 may increment a counter indicating a number of image frames captured, incrementing the counter after capturing each image frame. The AON camera controller 206 may check the number of image frames captured prior to capturing a new image frame. If the configured threshold of image frames has been met, the AON camera controller 206 may power off the AON camera 202 and the biometric detector 210, thereby returning the SoC 100 to stage 0 power state.

It should be noted that other suitable audio/sensor events and operational parameters of the AON camera 202 may be included in Table 1. For example, other audio/sensor events may include luminance of ambient light detection, volume of noise detected, etc. Other operation parameters of the AON camera 202 may include shutter speed, zoom, aperture, etc.

In some examples, the transition from stage 0 to stage 1 can be triggered by a "smart sensor" or one or more specialized camera sensors with optical motion detection and/or biometric detection. For example, the smart sensor may be used in combination with the audio sensors and/or motion sensors to trigger the optical biometric detector and the AON camera 202.

If a biometric candidate for authentication is detected by the optical biometric detector 210, then a transition from stage 1 to stage 2 is triggered. In stage 2, without the first subsystem 209 leaving island mode, the initial authentication filter 212 is enabled. In some examples, any biometric properties or characteristics detected in an image frame by the optical biometric detector 210 is evaluated with an initial stage authentication filter process to determine the likelihood that the biometric properties may lead to a successful authentication of a user via a full-feature authentication process.

As noted above, in some examples, the initial authentication filter 212 is a simpler and lower power process than the full-feature authentication process. For example, the full-feature authentication process must maintain a chain of trusted (untamperable) execution procedures, while the initial authentication filter 212 is an early-stage authentication filter having less stringent processes. For example, the full-feature authentication process may require a high authentication accuracy (e.g., requiring high resolution image frames captured by the second camera sensor 204), whereas the initial authentication filter 212 may use relatively lower resolution image frames captured by the AON camera sensor 202 with relatively lower authentication accuracy. Accordingly, it should be noted that in some examples, the initial authentication filter 212 is a precursor to a full-feature authentication process, and is not configured to act as a substitute process for authenticating the user. Table 2 below provides an example comparison of features in the full-feature authentication process versus the initial authentication filter 212 of the initial authentication process 300. It should be noted that each process may utilize a combination of one or more of the features shown below.

TABLE 2

| Early Stage Authentication Filter | Full-Feature Authentication Flow |
| --- | --- |
| A linear regression model on a small number of visual features (e.g., local binary pattern) | A linear regression model on a larger number of visual features (e.g., local binary pattern, histogram of oriented gradients, etc.) |
| A small convolutional neural network (e.g., LeNet) | A large convolutional neural network (e.g., visual geometry group (VGG)) |
| An algorithm run on a low resolution image | An algorithm run on a higher resolution image |

In some examples, the biometric properties detected by the optical biometric detector 210 are determined by the initial authentication filter 212 to have a likelihood of authentication if the initial authentication filter 212 can determine whether the detected biometric data of the image frame matches one or more aspects of reference biometric data of a user stored in the device. For example, the initial authentication filter 212 may detect a user configurable threshold number of similar points between the biometric data detected by the optical biometric detector 210 and stored reference biometric data (e.g., stored locally in the memory module 116 of FIG. 1 and/or remotely).

If the initial authentication filter 212 cannot detect a threshold number of similar points between the biometric data detected by the optical biometric detector 210 and the stored reference biometric data, then the first subsystem 209 may re-enter the stage 0 power state by powering off the AON camera 202, the AON camera controller 206, the optical biometric detector 210, and the initial authentication filter 212. Otherwise, if the initial authentication filter 212 detects a threshold number of similar points between the biometric data detected by the optical biometric detector 210 and the stored reference biometric data, then stage 3 is entered, and a full-feature authentication process is initiated.

In some examples, the full-feature authentication process is performed by hardware and software on the non-island subsystem 211. For example, the image processing hardware 214 may be configured to perform the full-feature authentication process using image frames captured by the primary camera sensor 204. Thus, in some examples, the island sensor processor 208 may be configured to power on the second camera sensor in response to a determination by initial authentication filter 212 that the detected biometric data matches the reference biometric data of the user.

Figure 4:
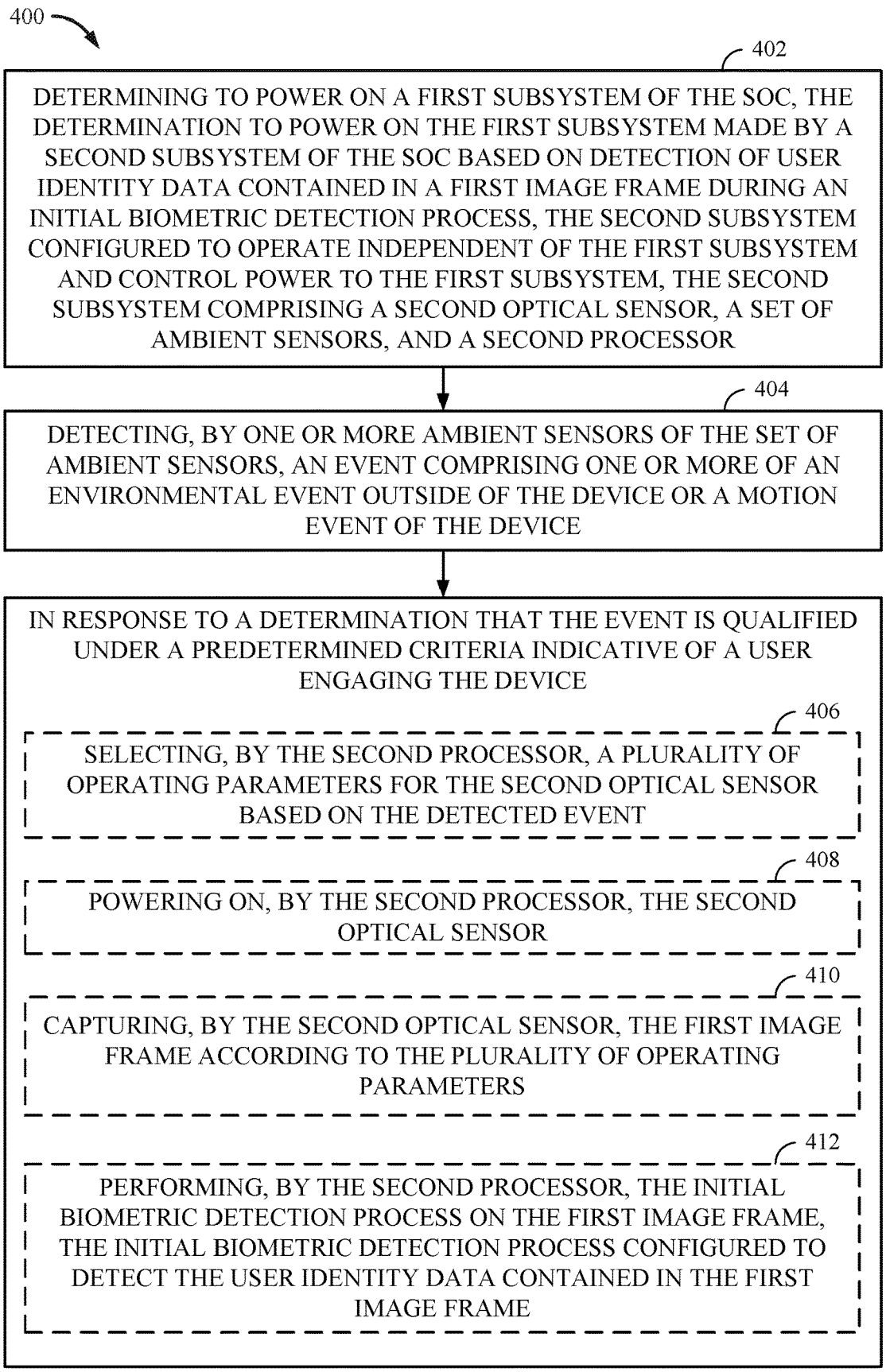
FIG. 4 is a flow diagram illustrating an example process for command queue management in accordance with certain aspects of the present disclosure.

FIG. 4 is a flow chart illustrating example operations 400 for optical biometric user authentication by a system on a chip (SoC) (e.g., SoC 100 of FIGS. 1 and 2) in a device (e.g., a mobile device). The operations 400 may be performed, for example, by one or more processors (e.g., CPU 102, DSP 104, and/or application processor 106) of the processor system 120, using software stored on a computer-readable storage device (e.g., a processor memory 108 and/or memory module 116 of the SoC 100). That is, operations 400 may be implemented as software components that are executed and run on the one or more processors. In certain aspects, the transmission and/or reception of data by various hardware components may be implemented via a bus interface (e.g., bus module 110 of FIG. 1).

In this example, the operations 400 start at step 402 with determining to power on a first subsystem of the SoC. In certain aspects, the determination to power on the first subsystem is made by a second subsystem of the SoC based on detection of user identity data contained in a first image frame during an initial biometric detection process, the second subsystem configured to operate independent of the first subsystem and control power to the first subsystem, the second subsystem comprising a second optical sensor, a set of ambient sensors, and a second processor.

The operations 400 may then proceed to step 404 with detecting, by one or more ambient sensors of the set of ambient sensors, an event comprising one or more of an environmental event outside of the device or a motion event of the device.

In response to a determination that the event is qualified under a predetermined criteria indicative of a user engaging the device, the operations 400 may then proceed to step 406 with selecting, by the second processor, a plurality of operating parameters for the second optical sensor based on the detected event.

The operations 400 may then proceed to step 408 with powering on, by the second processor, the second optical sensor.

The operations 400 may then proceed to step 410 with capturing, by the second optical sensor, the first image frame according to the plurality of operating parameters.

The operations 400 may then proceed to step 412 with performing, by the second processor, the initial biometric detection process on the first image frame, the initial biometric detection process configured to detect the user identity data contained in the first image frame.

In certain aspects, the plurality of operating parameters include an image resolution, a framerate, and a focal length of the second optical sensor.

In certain aspects, detecting the environmental event of the device further comprises detecting a change in ambient light by one or more of an ambient light sensor of the set of ambient sensors or the second optical sensor, wherein the change in ambient light is qualified under the predetermined criteria based on the change in ambient light exceeding a threshold illuminance, or detecting a sound by at least an audio sensor of the set of ambient sensors, wherein the sound is qualified under the predetermined criteria based on the sound exceeding a threshold volume.

In certain aspects, detecting the motion event of the device further comprises detecting the motion event of the device using one or more motion sensors of the set of ambient sensors, the one or more motion sensors comprising at least one of a barometer, a gyroscope, or an accelerometer.

In certain aspects, upon a failure of the initial biometric detection process to detect user identity data contained in the first image frame, the method further comprises determining a number of image frames captured since powering on the second optical sensor, if the number of image frames captured is greater than a threshold value, powering off the second optical sensor, and if the number of image frames captured is less than the threshold value: capturing, via the second optical sensor, a second image frame, and performing the initial biometric detection process on the second image frame.

In certain aspects, detecting user identity data contained in the first image frame further comprises detecting physical characteristics of the user via a neural network model.

In certain aspects, detecting user identity data contained in the first image frame further comprises: comparing the detected user identity data to reference identity data stored on the device by performing an initial authentication process, and determining, via the initial authentication process, whether the detected user identity data matches the reference identity data stored in the device.

In certain aspects, the first subsystem comprises a first optical sensor and a first processor, the first optical sensor is configured to support a full authentication process separate from the initial authentication process, and the full authentication process configured to authenticate the user for access to the device using a full biometric detection process separate from the initial biometric detection process.

In certain aspects, the second optical sensor is a low power and low resolution optical sensor relative to the first optical sensor.

Additional Considerations

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for" or simply as a "block" illustrated in a figure.

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. The software may be stored on non-transitory computer-readable medium included in the processing system.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A system on a chip (SoC) in a device, comprising:
a first subsystem of an SoC comprising a first optical sensor and a first processor;
a second subsystem of the SoC configured to operate independent of the first subsystem and control power to the first subsystem, the second subsystem comprising a second optical sensor, a set of ambient sensors, and a second processor, the second processor configured to:
detect, via the set of ambient sensors, an event comprising one or more of an environmental event outside of the device or a motion event of the device; and
in response to a determination that the event is qualified under a predetermined criteria indicative of a user engaging the device, the second processor is further configured to:
select a plurality of operating parameters for the second optical sensor based on the detected event, wherein the plurality of operating parameters include an image resolution, a framerate, and a focal length of the second optical sensor;
power on the second optical sensor;
capture, via the second optical sensor, a first image frame according to the plurality of operating parameters; and
perform an initial biometric detection process on the first image frame, the initial biometric detection process configured to detect user identity data contained in the first image frame.

2. The SoC of claim 1, wherein the second processor, being configured to detect the environmental event of the device, is further configured to detect one or more of:
a change in ambient light by one or more of an ambient light sensor of the set of ambient sensors or the second optical sensor, wherein the change in ambient light is qualified under the predetermined criteria based on the change in ambient light exceeding a threshold illuminance; or
a sound by at least an audio sensor of the set of ambient sensors, wherein the sound is qualified under the predetermined criteria based on the sound exceeding a threshold volume.

3. The SoC of claim 1, wherein the second processor, being configured to detect the motion event of the device, is further configured to detect the motion event using one or more motion sensors of the set of ambient sensors, the one or more motion sensors comprising at least one of a barometer, a gyroscope, or an accelerometer.

4. The SoC of claim 1, wherein, upon a failure of the initial biometric detection process to detect user identity data contained in the first image frame, the second processor is further configured to:
determine a number of image frames captured since powering on the second optical sensor;
if the number of image frames captured is greater than a threshold value, power off the second optical sensor; and
if the number of image frames captured is less than the threshold value:
capture, via the second optical sensor, a second image frame; and
perform the initial biometric detection process on the second image frame.

5. The SoC of claim 1, wherein the second processor, being configured to detect user identity data contained in the first image frame, is further configured to detect physical characteristics of the user via a neural network model.

6. The SoC of claim 1, wherein the second processor, being configured to detect user identity data contained in the first image frame, is further configured to:
compare the detected user identity data to reference identity data stored on the device by performing an initial authentication process; and
determine, via the initial authentication process, whether the detected user identity data matches the reference identity data stored in the device.

7. The SoC of claim 6, wherein:
the second processor is further configured to power on the first subsystem in response to the determination that the detected user identity data matches the reference identity data,
the first optical sensor is configured to support a full authentication process separate from the initial authentication process, and
the full authentication process is configured to authenticate the user for access to the device using a full biometric detection process separate from the initial biometric detection process.

8. The SoC of claim 7, wherein the second optical sensor is a low power and low resolution optical sensor relative to the first optical sensor.

9. The SoC of claim 1, wherein the second processor, being configured to power on the second optical sensor in response to determining the event is qualified, is further configured to:
prior to powering on the second optical sensor:
determine that the second optical sensor is powered off;
determine a duration of elapsed time since the second optical sensor was last powered on;
power on the second optical sensor if the duration of elapsed time is greater than a threshold duration of time; and refrain from powering on the second optical sensor if the duration of elapsed time is less than the threshold duration of time.

10. A method for optical biometric user authentication by a system on a chip (SoC) in a device, comprising:
   determining to power on a first subsystem of the SoC, the determination to power on the first subsystem made by a second subsystem of the SoC based on detection of user identity data contained in a first image frame during an initial biometric detection process, the second subsystem configured to operate independent of the first subsystem and control power to the first subsystem, the second subsystem comprising a second optical sensor, a set of ambient sensors, and a second processor;
   detecting, by one or more ambient sensors of the set of ambient sensors, an event comprising one or more of an environmental event outside of the device or a motion event of the device; and
   in response to a determination that the event is qualified under a predetermined criteria indicative of a user engaging the device:
      selecting, by the second processor, a plurality of operating parameters for the second optical sensor based on the detected event, wherein the plurality of operating parameters include an image resolution, a framerate, and a focal length of the second optical sensor;
      powering on, by the second processor, the second optical sensor;
      capturing, by the second optical sensor, the first image frame according to the plurality of operating parameters; and
      performing, by the second processor, the initial biometric detection process on the first image frame, the initial biometric detection process configured to detect the user identity data contained in the first image frame.

11. The method of claim 10, wherein detecting the environmental event of the device further comprises detecting one or more of:
   a change in ambient light by one or more of an ambient light sensor of the set of ambient sensors or the second optical sensor, wherein the change in ambient light is qualified under the predetermined criteria based on the change in ambient light exceeding a threshold illuminance; or
   a sound by at least an audio sensor of the set of ambient sensors, wherein the sound is qualified under the predetermined criteria based on the sound exceeding a threshold volume.

12. The method of claim 10, wherein detecting the motion event of the device further comprises:
   detecting the motion event of the device using one or more motion sensors of the set of ambient sensors, the one or more motion sensors comprising at least one of a barometer, a gyroscope, or an accelerometer.

13. The method of claim 10, wherein, upon a failure of the initial biometric detection process to detect user identity data contained in the first image frame, the method further comprises:
   determining a number of image frames captured since powering on the second optical sensor;
   if the number of image frames captured is greater than a threshold value, powering off the second optical sensor; and
   if the number of image frames captured is less than the threshold value:
      capturing, via the second optical sensor, a second image frame; and
      performing the initial biometric detection process on the second image frame.

14. The method of claim 10, wherein detecting user identity data contained in the first image frame further comprises detecting physical characteristics of the user via a neural network model.

15. The method of claim 10, wherein detecting user identity data contained in the first image frame further comprises:
   comparing the detected user identity data to reference identity data stored on the device by performing an initial authentication process; and
   determining, via the initial authentication process, whether the detected user identity data matches the reference identity data stored in the device.

16. The method of claim 15, wherein:
   the first subsystem comprises a first optical sensor and a first processor,
   the first optical sensor is configured to support a full authentication process separate from the initial authentication process, and
   the full authentication process configured to authenticate the user for access to the device using a full biometric detection process separate from the initial biometric detection process.

17. The method of claim 16, wherein the second optical sensor is a low power and low resolution optical sensor relative to the first optical sensor.

18. A non-transitory computer-readable storage medium that stores instructions that when executed by a processor of an apparatus cause the apparatus to perform a method for optical biometric user authentication, the method comprising:
   determining to power on a first subsystem of the SoC, the determination to power on the first subsystem made by a second subsystem of the SoC based on detection of user identity data contained in a first image frame during an initial biometric detection process, the second subsystem configured to operate independent of the first subsystem and control power to the first subsystem, the second subsystem comprising a second optical sensor, a set of ambient sensors, and a second processor;
   detecting, by one or more ambient sensors of the set of ambient sensors, an event comprising one or more of an environmental event outside of the apparatus or a motion event of the apparatus; and
   in response to a determination that the event is qualified under a predetermined criteria indicative of a user engaging the apparatus:
      selecting, by the second processor, a plurality of operating parameters for the second optical sensor based on the detected event, wherein the plurality of operating parameters include an image resolution, a framerate, and a focal length of the second optical sensor;
      powering on, by the second processor, the second optical sensor;
      capturing, by the second optical sensor, the first image frame according to the plurality of operating parameters; and
      performing, by the second processor, the initial biometric detection process on the first image frame, the initial biometric detection process configured to detect the user identity data contained in the first image frame.

* * * * *